US006959932B2

(12) United States Patent
Svartz et al.

(10) Patent No.: US 6,959,932 B2
(45) Date of Patent: Nov. 1, 2005

(54) ELECTRONIC HEIGHT CONTROL

(75) Inventors: Bjorn O. Svartz, Jamestown, NC (US); Darris White, Superior, CO (US)

(73) Assignee: Volvo Trucks North America, Inc., Greensboro, NC (US)

( * ) Notice: Subject to any disclaimer, the term of this patent is extended or adjusted under 35 U.S.C. 154(b) by 149 days.

(21) Appl. No.: 10/287,315

(22) Filed: Nov. 4, 2002

(65) Prior Publication Data
US 2004/0084860 A1 May 6, 2004

(51) Int. Cl.$^7$ .............................................. B60G 17/01
(52) U.S. Cl. ................................ 280/5.514; 280/6.151; 280/6.159; 280/124.157
(58) Field of Search .................... 280/124.128, 124.153, 280/124.157, 5.514, 6.151, 6.159, 124.148, 124.151

(56) References Cited

U.S. PATENT DOCUMENTS

| | | | | |
|---|---|---|---|---|
| 4,667,978 A | * | 5/1987 | Asami et al. ............. | 280/5.514 |
| 4,787,644 A | * | 11/1988 | Yokote et al. ........... | 280/6.157 |
| 4,877,263 A | | 10/1989 | Konishi et al. | |
| 5,071,158 A | | 12/1991 | Yonekawa et al. | |
| 5,074,569 A | | 12/1991 | Kawabata | |
| 5,461,564 A | | 10/1995 | Collins et al. | |
| 5,515,274 A | | 5/1996 | Mine et al. | |
| 5,517,847 A | * | 5/1996 | Campbell et al. .......... | 73/11.07 |
| 5,556,115 A | * | 9/1996 | Heyring .................... | 280/6.158 |
| 5,684,698 A | | 11/1997 | Fujii et al. | |
| 5,696,678 A | | 12/1997 | Raad et al. | |
| 5,769,400 A | | 6/1998 | Hözl et al. | |
| 5,855,379 A | | 1/1999 | Buma et al. | |
| 5,999,868 A | | 12/1999 | Beno et al. | |
| 6,000,702 A | | 12/1999 | Streiter | |
| 6,058,340 A | | 5/2000 | Uchiyama et al. | |
| 6,061,615 A | | 5/2000 | Karthaeuser | |
| 6,282,470 B1 | | 8/2001 | Shono et al. | |
| 6,293,562 B1 | | 9/2001 | Kutscher | |
| 6,345,826 B1 | * | 2/2002 | Kurzeja et al. ............. | 280/5.5 |
| 6,431,557 B1 | * | 8/2002 | Terborn et al. ............ | 280/6.15 |
| 6,490,540 B1 | * | 12/2002 | Kurzeja et al. ............. | 702/151 |
| 6,616,150 B2 | * | 9/2003 | Reisinger et al. ........ | 280/5.514 |
| 6,679,509 B1 | * | 1/2004 | Galazin et al. ....... | 280/124.116 |
| 6,758,302 B2 | * | 7/2004 | Penzotti ...................... | 180/383 |

FOREIGN PATENT DOCUMENTS

EP  0249487  12/1987

* cited by examiner

Primary Examiner—Paul N. Dickson
Assistant Examiner—Toan C To
(74) Attorney, Agent, or Firm—Watts Hoffmann Co., LPA

(57) ABSTRACT

A method for controlling the ride height in a suspension of an over the highway truck or tractor based on rear axle load. A load on the rear axle is measured. An optimum ride height is calculated at core response to correct drive lighted angles based on the rear axle load. The actual ride height is measured. The difference between the optimum ride height and the actual ride height is calculated. A component of the suspension, such as an air spring, is adjusted to adjust the actual ride height to a height closer to the optimum ride height.

35 Claims, 5 Drawing Sheets

ELECTRONIC HEIGHT CONTROL

FIELD OF THE INVENTION

The present invention relates generally to a suspension for an over-the-highway truck or tractor vehicle. In particular, the present invention relates to an suspension that includes an electronic system for controlling ride height.

BACKGROUND OF THE INVENTION

Existing ride height control systems for over the highway trucks and tractors control only the distance between a point on the suspension and the frame of the truck or tractor. As the vehicle load and operating conditions change, existing ride height control systems work only to maintain this distance. Since leaf springs of an air spring suspension deflect under load, maintaining the height of a specific point on the suspension does not maintain correct driveline angles. As a result, some driveline error is introduced when the vehicle is either loaded or unloaded. These driveline errors are responsible for vibrations in the driveline.

Flow characteristics of the ride height control system is partially responsible for the air consumption rate of the vehicle. The air consumption rate impacts the compressor life and fuel economy of the vehicle. Traditional mechanical ride height control systems compromise between accurately controlling the ride height and reducing the air consumption rate. In order to reduce air consumption, existing mechanical systems include a dead band of ride heights where the system does not react. The dead band allows the suspension ride height to vary from the initial setting by a specific amount before adjustments are made. Without a dead band in a mechanical system, dynamic road inputs would cause the system to constantly fill and exhaust air. The dead band reduces the responsiveness of the ride height control system.

There is a need for an electronic ride height control system that controls ride height based on vehicle loading to maintain proper driveline angles. There is also a need for an electronic ride height control system that has a reduced dead band.

SUMMARY OF THE INVENTION

The present invention concerns a method for controlling the ride height in a suspension of an over the highway truck or tractor based on a load on a rear axle. In the method, a load on the rear axle is measured. An optimum ride height is calculated. The optimum ride height corresponds to a ride height that results in correct driveline angles. This optimum ride height is based on the rear axle load. An actual ride height is measured. The difference between the optimum ride height and the actual ride height is calculated. A component of the suspension is adjusted to adjust the actual ride height to a height closer to the optimum ride height.

The rear axle load may be calculated in a variety of ways. In one embodiment, the rear axle load is calculated by monitoring pressure in an air spring of said suspension. In another embodiment, the rear axle load is determined by monitoring acceleration of the truck or tractor and monitoring torque and engine speed of an engine of the truck or tractor. A gross vehicle weight is calculated based on the acceleration, engine torque and engine speed. The rear axle load is then calculated based on the gross vehicle weight.

In one embodiment, the actual ride height is sampled over a period of time. A dynamic component of the ride height is removed using a filter. In this embodiment, the speed of the truck or tractor may be monitored. The actual ride height samples may be taken over a shorter period of time when the vehicle is moving slowly or is stopped.

In one embodiment, the duration an air spring valve is opened to adjust the ride height is modified based on the rear axle load. In this embodiment, the duration the air spring valve opens to fill the air spring may increase as rear axle load increases.

In one embodiment, the ride height is adjusted only when the difference between the actual ride height and the optimum ride height exceeds a threshold value. In this embodiment, air may be exhausted from an air spring to reduce the ride height when the actual ride height exceeds the optimum ride height by an amount greater than the threshold value. Air may be added to the air spring to increase the ride height when the optimum ride height exceeds the actual ride height by an amount greater than the threshold value.

One apparatus for controlling the ride height in a suspension of an over the highway truck or tractor based on a load on the rear axle includes a pressure sensor, an electronic control unit, a height sensor, and a valve coupled to an air spring. The pressure sensor for measures a pressure in the air spring to determine the load on the rear axle. The electronic control unit is coupled to the pressure sensor. The electronic control unit calculates the optimum ride height based on the rear axle load. The height sensor measures the actual ride height. The electronic control unit calculates a difference between the optimum ride height and the actual ride height. The valve is controlled by the electronic control unit to adjust the amount of air in the air spring to adjust the actual ride height to a height that is closer to the calculated optimum ride height.

In one embodiment, the air spring pressure sensor is replaced with an engine torque sensor and an acceleration sensor. In this embodiment, the engine torque and vehicle acceleration is used to calculate the rear axle load.

In one embodiment, an electronic ride height control system is used on a trailing arm type suspension. A trailing arm suspension includes a hanger bracket attached to a vehicle frame member and a leading end of a trailing arm. The hanger bracket defines a pivot axis for the trailing arm. An air spring is disposed between a spring seat attached to the trailing arm and the frame member. An axle is attached to the trailing arm. A pressure sensor may be coupled to the air spring to determine load on the axle or an engine torque sensor and an acceleration sensor may be used to calculate load on the axle. The electronic control unit calculates an optimum ride height that corresponds to correct driveline angles based on the rear axle load. A height sensor coupled the frame member and the trailing arm provides a signal to the electronic control unit that is indicative of actual ride height. The electronic control unit calculates a difference between the optimum ride height and the actual ride height. A valve coupled to the air spring is controlled by the electronic control unit to adjust the amount of air in the air spring to adjust the actual ride height.

Additional features of the invention will become apparent and a fuller understanding will be obtained by reading the following detailed description in connection with the accompanying drawings.

DETAILED DESCRIPTION OF THE INVENTION

Figure 1:
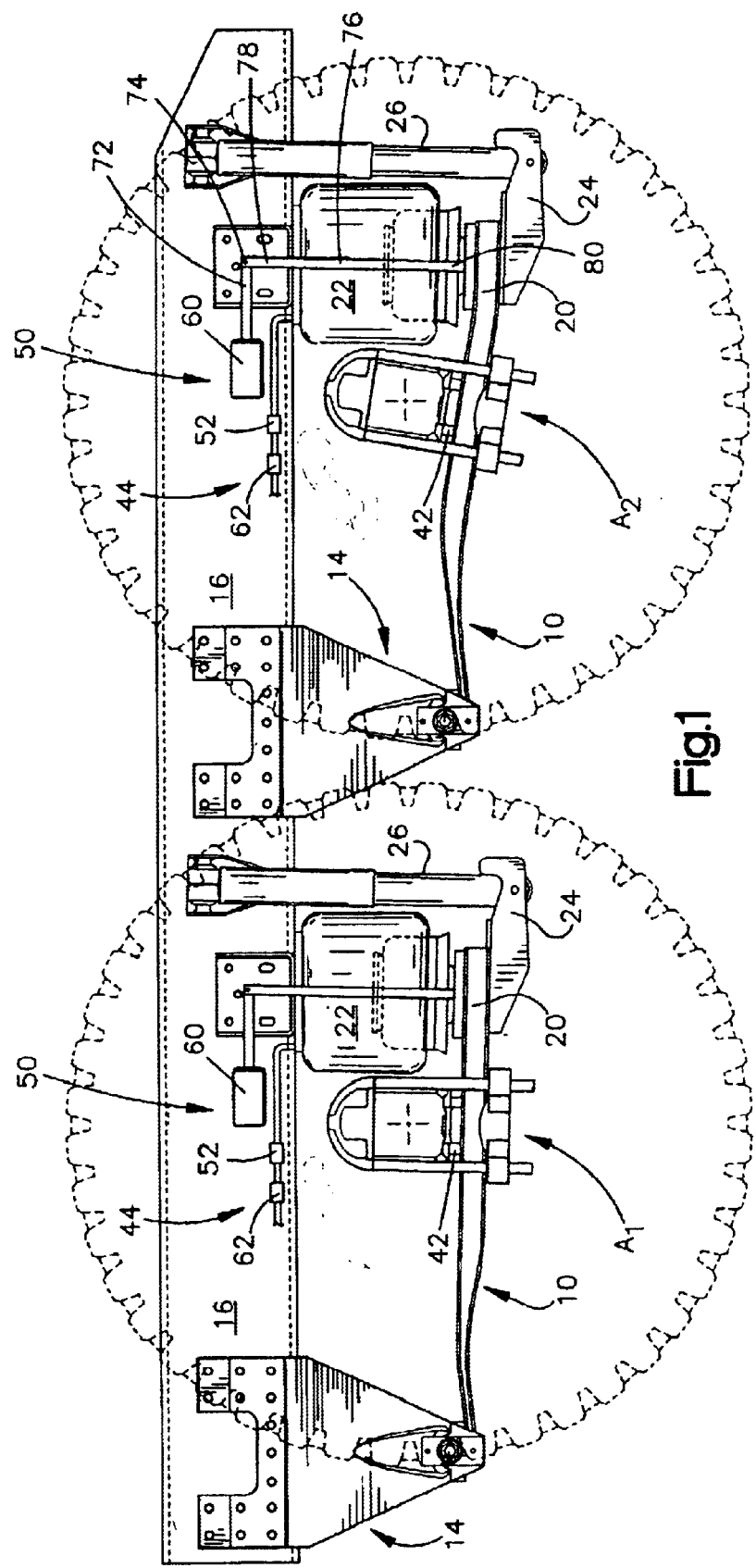
FIG. 1 is a side elevational view of a rear suspension for a dual axle vehicle, such as a Class 8 highway truck.

FIG. 1 illustrates a rear suspension of a tractor unit of a highway truck constructed in accordance with one embodiment of the invention. The illustrated suspension is intended for use with a tractor unit having dual rear axles, indicated generally by the reference characters A1, A2. However, the invention can be used with a tractor unit having a single rear axle.

Figure 2:
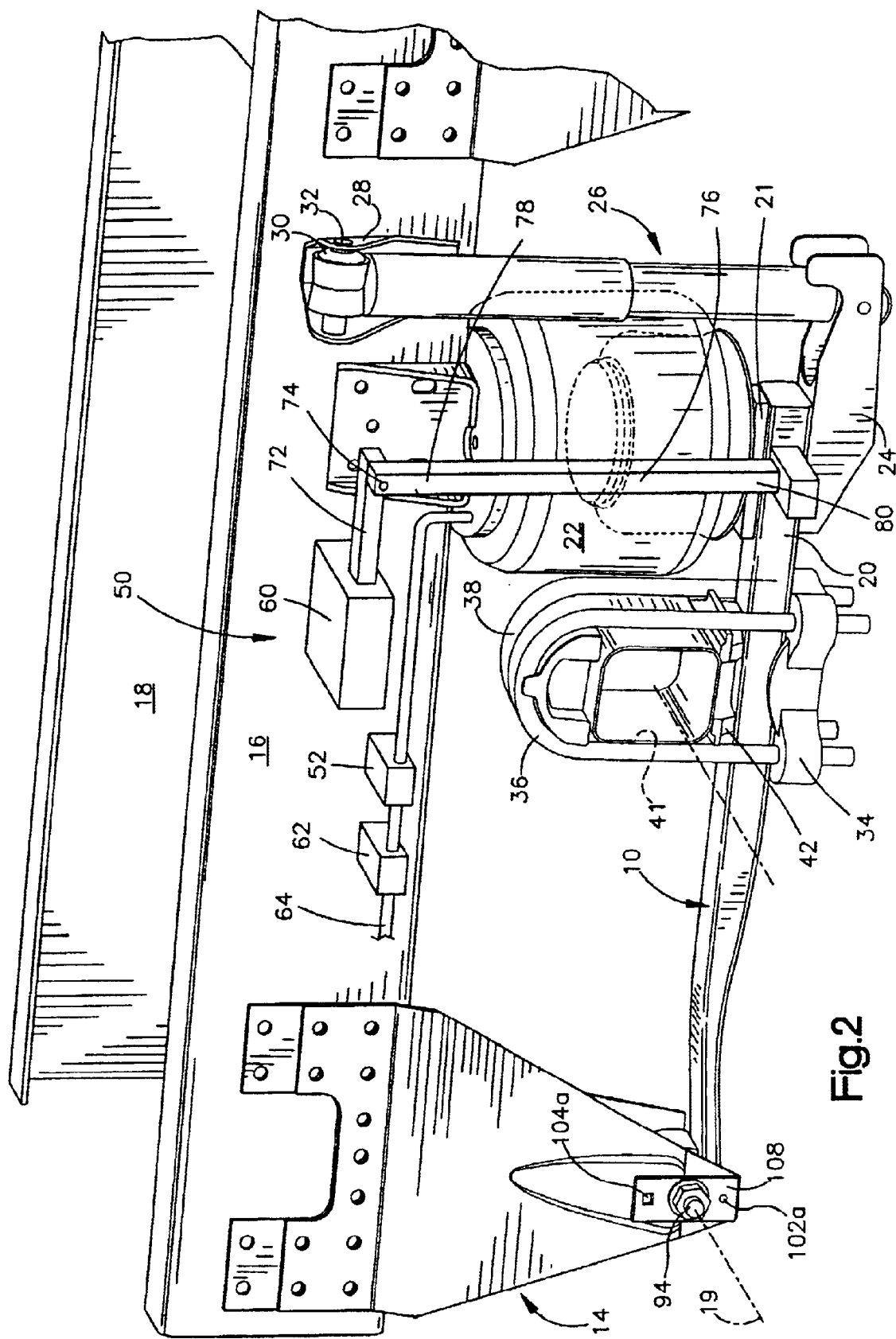
FIG. 2 is a fragmentary rear view of the suspension shown in FIG. 1.
Figure 3A:
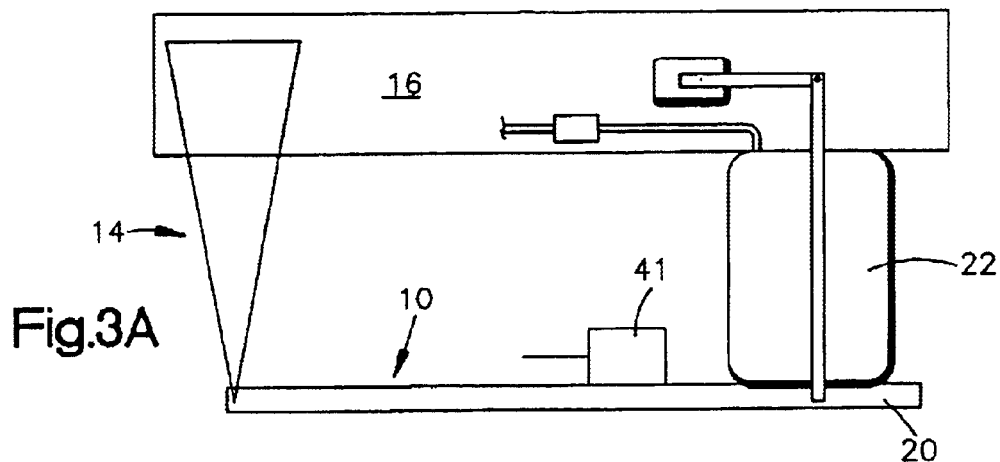
FIG. 3A is a schematic representation of an air suspension with existing height control in an unloaded condition.
Figure 3B:
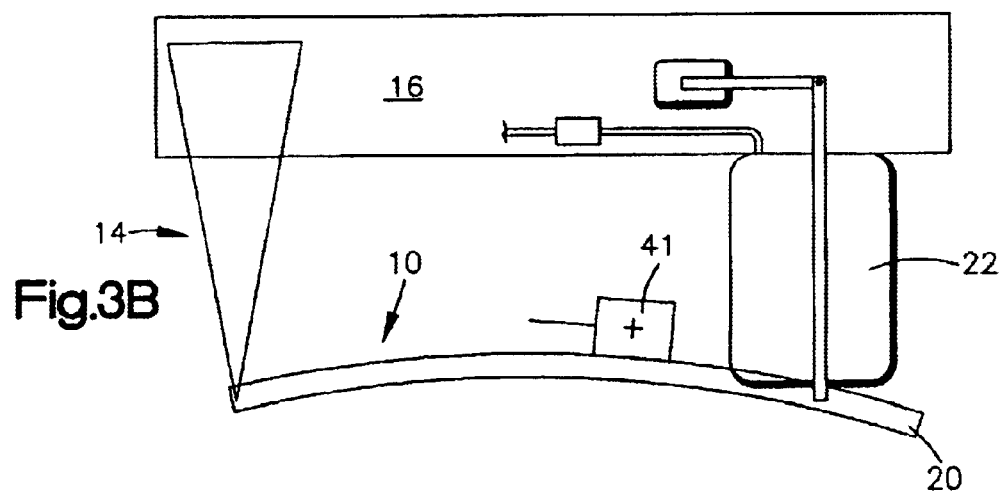
FIG. 3B is a schematic representation of an air suspension with existing height control in a loaded condition.
Figure 3C:
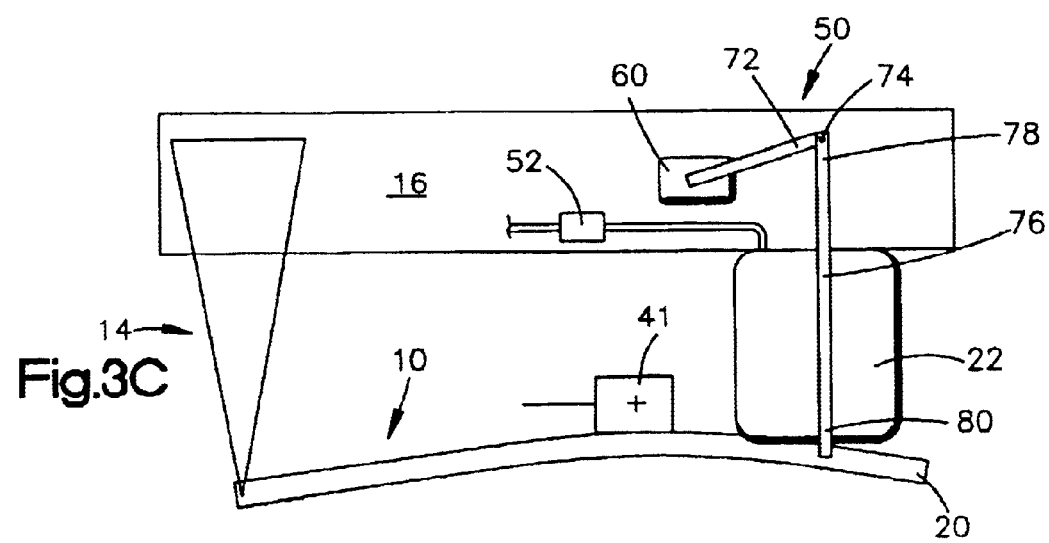
FIG. 3C is a schematic representation of an air suspension with an electronic height control system in accordance with the present invention in a loaded condition.

For purposes of explanation, the suspension components for the leading rear axle A1 will be described and are illustrated in FIG. 2. It should be understood, however, that the inventive features can be used on either or both of the rear axle suspensions.

The suspension illustrated in FIG. 2 is best characterized as a trailing arm, pneumatic or air suspension. In particular, the suspension includes a trailing arm 10, the forward end of which is held by a trailing arm hanger bracket 14. As seen best in FIG. 2, the hanger bracket 14 is mounted to and depends downwardly from the side of a frame rail or frame member 16 and defines a pivot axis 19 for the trailing arm 10. Like components (not shown) are mounted to an opposite frame member 18.

The opposite end (i.e. trailing end 20) of the trailing arm 10 defines a seat 21 for a spring unit 22. In the illustrated embodiment, the spring unit comprises a conventional pneumatic cushion filled with air at a predetermined pressure. The air pressure acts as an air spring and may be varied to change the spring rate and ride height. A rearwardly extending bracket 24 connects the trailing end 20 of the trailing arm 10 to a shock absorber 26. In effect, the shock absorber 26 interconnects the trailing end 20 of the trailing arm 10 to the frame 16. The upper half or affixed end of the shock absorber 26 is secured to a bracket 28 that is attached to the frame 16. The upper part of the shock, preferably includes an elastomeric bushing 30. A securing bolt 32 extends through the bracket 28 and through the bushing 30 to secure the upper part of the shock 26 to the frame 16. The bushing 30 does allow some movement in the upper part of the shock to accommodate movement in the lower part of the shock as the trailing arm 10 rotates clockwise or counterclockwise about its pivot 19. The lower part of the shock 26 is pivotally connected to the extension bracket 24.

In the preferred embodiment, the trailing arm 10 is formed from spring steel and, in effect, acts as a single leaf-type spring. Spring steel is used as the trailing arm because its elasticity does allow some bending movement and, as a result, reduces stress levels at the various mounting points including the mounting location for the vehicle axle.

In the type of suspension illustrated in FIG. 1, the position of the axle housing is determined by its attachment to the trailing arm 10. During use, the axle moves upwardly and downwardly with respect to the frame 16, to accommodate road irregularities. Its path of movement is defined by the trailing arm 10.

In the illustrated construction, an outboard end of an axle housing is held to the trailing arm 10 by a pair of U-bolts 36, 38 which extend through a lower bracket 34 and, which in effect clamp the axle housing to the trailing arm. The left outboard end of the axle housing 41 sits on a saddle 42 which in turn rests on the trailing arm 10. In the preferred embodiment, a dowel pin (not shown) extends downwardly from the saddle 42 and engages a hole (not shown) formed in the trailing arm 10. The dowel pin serves to help locate the axle on the trailing arm and resists relative movement between the trailing arm 10 and the axle 41.

Figure 5A:
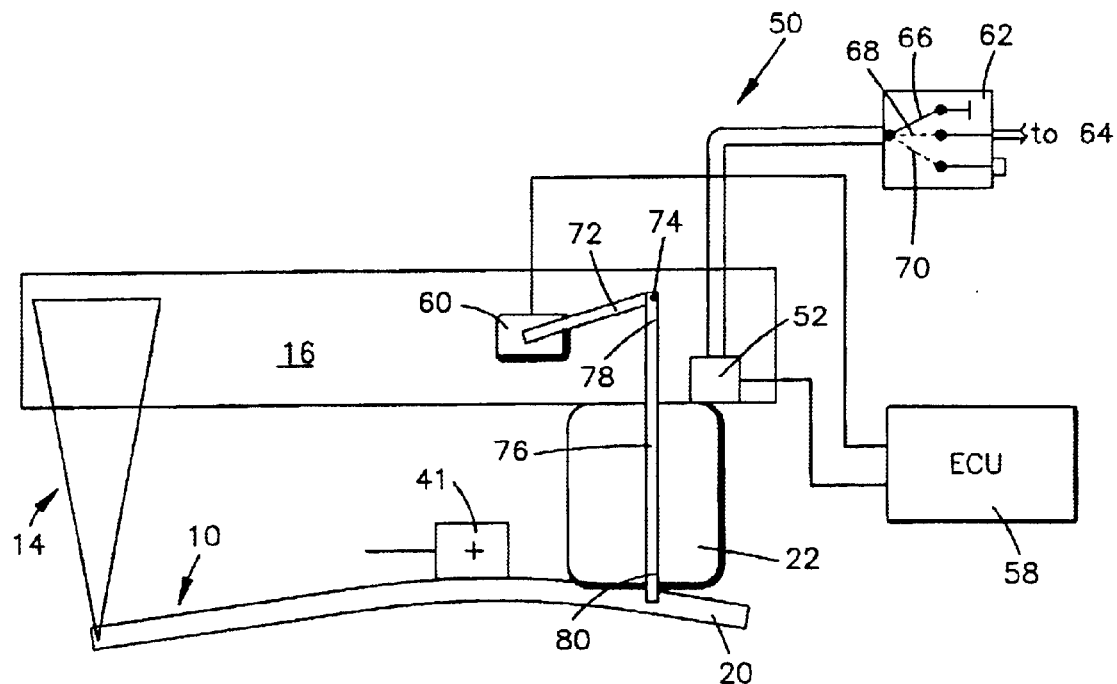
FIG. 5A is a schematic illustration of an electronic height control system in accordance with one embodiment.
Figure 5B:
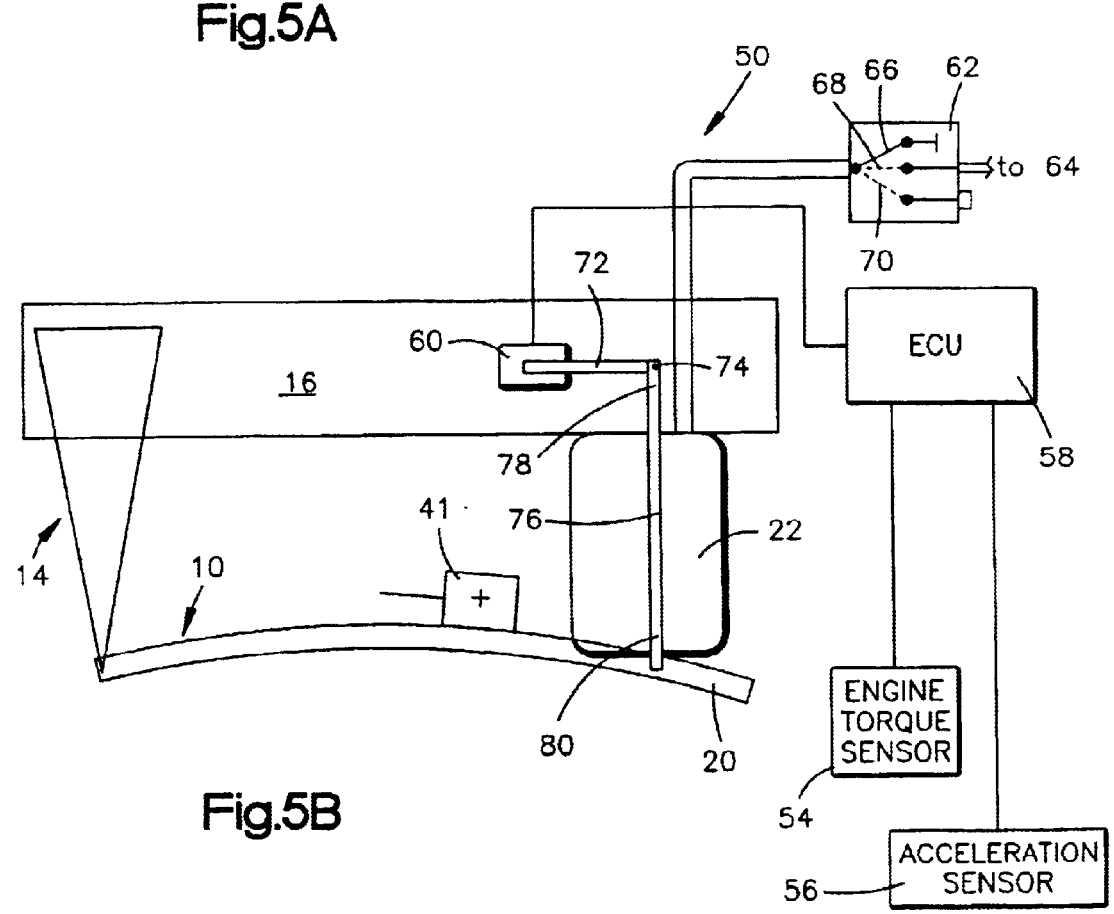
FIG. 5B is a schematic illustration of an electronic height control system in accordance with one embodiment.

The illustrated suspension is equipped with a system 50 for controlling the ride height of the suspension. The illustrated system 50 controls ride height based on a rear axle load of the truck or tractor. The rear axle load may be sensed by a pressure sensor 52 or an engine torque sensor 54 and an acceleration sensor 56 can be used to calculate the rear axle load. It should be readily apparent to those skilled in the art that a variety of other techniques could also be used to determine the load applied to the rear axle or axles. In one embodiment, a pressure sensor 52 measures pressure in the air spring 22 to determine the load on the rear axle 41. In one embodiment, a torque sensor 54 and an acceleration sensor 56 are used to calculate the gross weight of the vehicle, which is used to estimate the load on the rear axle. Referring to FIGS. 5A and 5B, in addition to the pressure sensor or torque sensor and acceleration sensor, the system 50 includes an electronic control unit 58, a height sensor 60 and a valve 62 in the exemplary embodiment. The electronic control unit is coupled to pressure sensor 52 or the torque sensor 54 and acceleration sensor 56.

The electronic control unit calculates an optimum ride height that corresponds to correct drive line angles based on the rear axle load. The height sensor is coupled to the electronic control unit. The height sensor measures the actual ride height of the suspension. The electronic control unit calculates the difference between the optimum ride height and the actual ride height measured by the height sensor. In the exemplary embodiment, the valve 62 is coupled to the air spring 22 and is controlled by the electronic control unit. The electronic control unit adjusts the amount of air in the air spring 22 to adjust the actual ride height to a-height closer to the optimum ride height.

FIG. 5A illustrates one embodiment where the rear axle load is measured with a pressure sensor 52. In the illustrated embodiment, the pressure sensor is disposed between an air supply 64 and the air spring 22. In an alternate embodiment, the air supply 64 may be coupled directly to the air spring 22 via the valve 62 and the pressure sensor 52 may be connected separately to the air spring 22. One acceptable pressure sensor is available from Bosch.

FIG. 5B illustrates an embodiment where a torque sensor 54 and an acceleration sensor 56 are used to determine the rear axle load. In one embodiment, the engine torque sensor and acceleration sensor are pre-existing components of the truck or tractor. The engine torque and vehicle acceleration data provided by the engine torque sensor and acceleration sensor are available to the electronic control unit 58 via a data bus of the truck or tractor. The electronic control unit monitors engine torque and acceleration of the vehicle to determine an approximated rear axle load of the vehicle.

Referring to FIGS. 5A and 5B, the valve 62 is interposed between the air supply 64 and the air spring 22. The valve 62 is controlled by the electronic control unit 58. In the exemplary embodiment, the valve 62 is a three-way valve. In the illustrated embodiment when the valve is in the first position 66 the valve 62 prevents air from entering or exiting the air spring 22. When the valve 62 is in a second position 68 open to the air supply 64 air flows from the air supply 64 into the air spring 22, adding air under pressure to the air spring. When the valve 62 is in the third position 70 open to atmosphere, air under pressure flows from the air spring 22 through the valve and is exhausted to atmosphere to decrease the amount of air in the air spring 22. One acceptable valve is available from Bosch.

Referring to FIGS. 5A and 5B, the electronic control unit 58 is coupled to the height sensor 60. In the illustrated embodiment, the height sensor 60 is mounted to the frame member 16. The height sensor 60 includes an elongated member 72 in the illustrated embodiment. In the exemplary embodiment the elongated member 72 is rotatably connected to the height sensor 60, allowing an end portion 74 to move upward and downward along an arcuate path of travel. In the illustrated embodiment a second elongated member 76 is pivotally connected to the first elongated member 72 at an end portion 78. A second end portion 80 of the second elongated member is connected to the trailing arm 10. Movement of the trailing arm 10 causes second elongated member 76 to move up or down. Movement of the trailing arm 10 is sensed by the height sensor 60.

The electronic control unit coupled to the height sensor 60 processes a signal provided by the height sensor to determine the actual ride height of the suspension. A variety of inputs may change the height, of the trailing arm 10. For example rear axle load, variations in the road, and air pressure in the air spring affect the ride height. The electronic control unit 58 uses inputs from the height sensor 60 and pressure sensor 52 or torque sensor 54 and acceleration sensor 56 to determine actual ride height and rear axle load.

In one embodiment, the ride height is controlled only for the forward rear axle that extends along axis A1. Referring to FIG. 1, the ride height of the rear axis that extends along axis A2 is dependant on the ride height of the forward rear axle. The ride height of the rear axle is determined by the ride height of the forward rear axle and the slope of the frame 16. The slope of the frame is determined by the ride height of the front axle and the forward rear axle.

The electronic control unit 58 calculates an optimum ride height based on the rear axle load. In the exemplary embodiment, the optimum ride height corresponds to drive line angles that minimize drive line vibrations. The trailing arms 10 deflect and rotate under rear axle load. Any slope of the frame results in different ride heights for the forward and rearward rear axles. As a result, the amount of deflection of the front trailing arm 10 connected to the axle that extends along axis A1 is different than the amount of deflection of the rear trailing arm 10 connected to the axle that extends along axis A2. The suspension illustrated by FIG. 1 illustrates deflection of the rear trailing arm that is different than the deflection of the forward rear trailing arm. As is apparent from FIG. 1, the axle that extends along A2 is carted as a result of the deflection. A small shaft (not shown) connects the axle that extends along axis A1 to the rear axle that extends along axis A2. The difference in deflection of the trailing arms changes the optimal angle of the small shaft that connects the rear axles. As a result, the driveline angles that result in minimal driveline vibrations change as the rear axle load changes. In the exemplary embodiment, a look-up table is included in the ECU that includes a list of rear axle loads and corresponding optimal ride heights that result in driveline angles that produce minimal driveline vibrations. The system looks at the rear axle load and finds the corresponding optimum ride height in the look up table.

Figure 4:
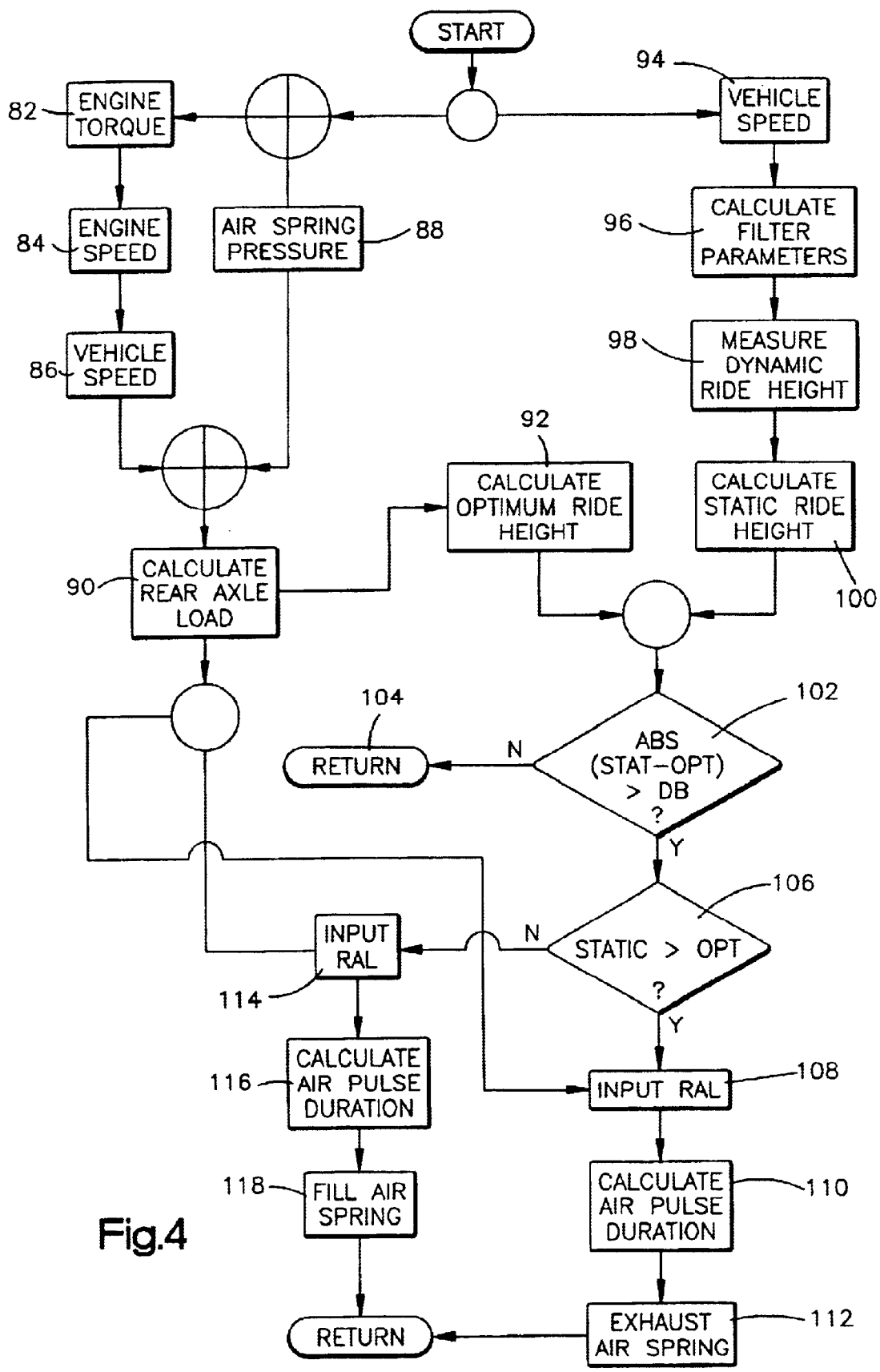
FIG. 4 is a flow chart that illustrates a method of controlling ride height.

FIG. 4 illustrates a method performed by the electronic control unit to optimize ride height based on rear axle load. The electronic control unit monitors engine torque 82, engine speed 84 and vehicle speed 86 and/or air spring pressure 88. The rear axle load is calculated 90 based on engine torque, engine speed and vehicle speed and/or air spring pressure. The optimum ride height is calculated 92 based on the rear axle load.

The electronic control unit monitors the vehicle speed 94. Filter parameters are calculated 96 based on the vehicle speed. The dynamic ride height is measured 98 over a period of time. The dynamic ride height is measured for a shorter period of time when the truck or tractor is moving at a slow speed or is stopped. The static ride height is calculated 100 by removing the dynamic component of the ride height measured by the electronic control unit through the height sensor 60. The dynamic ride height signal may be filtered through either a running average or a low pass filter.

In the exemplary embodiment, the ride height is adjusted only when the difference between the actual or static ride height and the optimum ride height exceeds the threshold value. The electronic control unit 58 determines 102 whether the difference between the calculated static ride height and optimum ride height is greater than the threshold value or dead band. If the difference between the static ride height and optimum ride height is less than the threshold value the method starts 104 over. If the difference between the static ride height and optimum ride height is greater than the threshold value, the method determines 106 whether the static ride height is greater than the optimum ride height.

When the method determines that the static ride height is greater than the optimum ride height the method uses 108 the rear axle load to calculate 110 an air exhaust pulse duration. In the exemplary embodiment, the duration the air spring valve 62 is open by the electronic control unit to exhaust air from the air spring decreases as rear axle load increases, because air will exhaust more quickly under a heavier rear axle load. The controller exhausts 112 the air spring via the valve 62 for the calculated air pulse duration to reduce the static ride height to a height that is closer to the optimum ride height. In the exemplary embodiment the calculated air pulse duration is calculated to bring the static ride height to the optimum ride height.

When the electronic control unit 58 determines 106 that the optimum ride height is greater than the static ride height, the method uses 114 the calculated rear axle load to calculate 116 an air inflation pulse duration. In the exemplary embodiment, the duration the air spring valve opens to fill the air spring increases as rear axle load increases, because more pressure is required in the air spring to increase the ride height when the rear axle load is greater. The electronic control unit opens the valve 62 for the calculated air inflation pulse duration to fill 118 the air spring and increase the static ride height to a value closer to the optimum ride height. In the exemplary embodiment, the calculated air inflation pulse increases the static ride height to the optimum ride height. In the exemplary embodiment, the system 50 repeats the method illustrated by FIG. 4 to continually optimize ride height.

Although the present invention has been described with a degree of particularity, it is the intent that the invention include all modifications and alterations falling within the spirit or scope of the appended claims.

We claim:

1. A method for controlling a ride height in a suspension of an over the highway truck or tractor having a rear axle, said method comprising:
   a) measuring a load on said rear axle;
   b) calculating an optimum ride height that corresponds to correct driveline angles based on said rear axle load;
   c) measuring an actual ride height;
   d) calculating a difference between said optimum ride height and said actual ride height; and
   e) adjusting a component of said suspension to adjust said actual ride height to a height closer to said optimum ride height.

2. The method of claim 1 wherein said rear axle load is calculated by monitoring pressure in an air spring of said suspension.

3. The method of claim 1 wherein said rear axle load is determined by monitoring a change in wheel speed of said truck or tractor, monitoring a torque and engine speed of an engine of said truck or tractor, calculating a gross vehicle weight based on the wheel speed, engine torque and engine speed, and calculating a rear axle load based on said gross vehicle weight.

4. The method of claim 1 further comprising monitoring a speed of said truck or tractor and wherein said actual ride height is monitored over a shorter period of time when said a motion of said truck or tractor is one of moving at a slow speed and stopped.

5. The method of claim 1 further comprising controlling a duration an air spring valve is opened to adjust said ride height based on said rear axle load.

6. The method of claim 5 wherein a duration the air spring valve opens to fill an air spring increases as rear axle load increases.

7. The method of claim 1 wherein said actual ride height is adjusted only when said difference between said actual ride height and said optimum ride height exceeds a threshold value.

8. A method for controlling a ride height in a suspension of an over the highway truck or tractor having a rear axle, said method comprising: a) measuring a load on said rear axle; b) measuring a speed of said over the highway truck or tractor; c) recording actual ride height values for a period of time; d) filtering said actual ride height values to remove a dynamic component of recorded ride height values; e) calculating a static ride height based on filtered ride height values; f) calculating an optimum ride height that corresponds to correct driveline angles based on said rear axle load; g) calculating a difference between said optimum ride height and said static ride height; and h) adjusting an amount of air in an air spring of said suspension to adjust said static ride height to a height closer to said optimum ride height.

9. The method of claim 8 wherein said rear axle load is calculated by monitoring pressure in an air spring of said suspension.

10. The method of claim 8 wherein said rear axle load is determined by monitoring a change in wheel speed of said truck or tractor, monitoring a torque and engine speed of an engine of said truck or tractor, calculating a gross vehicle weight based on the wheel speed, engine torque and engine speed, and calculating a rear axle load based on said gross vehicle weight.

11. The method of claim 8 wherein said actual ride height is monitored over a shorter period of time when said a motion of said truck or tractor is one of moving at a slow speed and stopped.

12. The method of claim 8 further comprising controlling a duration an air spring valve is opened to adjust said ride height based on said rear axle load.

13. The method of claim 12 wherein a duration the air spring valve opens to fill an air spring increases as rear axle load increases.

14. The method of claim 8 wherein said actual ride height is adjusted only when said difference between said static ride height and said optimum ride height exceeds a threshold value.

15. An apparatus for controlling a ride height in a suspension of an over the highway truck or tractor having a rear axle, said method comprising: a) a pressure sensor for measuring a pressure in an air spring of said suspension to determine a load on said rear axle; b) an electronic control unit coupled to said sensor that calculates an optimum ride height that corresponds to correct driveline angles based on said rear axle load; c) a height sensor coupled to said electronic control unit for measuring an actual ride height, said electronic control unit calculates a difference between said optimum ride height and said actual ride height; and d) a valve coupled to said air spring and controlled by said electronic control unit to adjust an amount of air in said air spring to adjust said actual ride height to a height closer to said optimum ride height.

16. The apparatus of claim 15 wherein said electronic control unit monitors said actual ride height over a period of time and removes a dynamic component of the actual ride height.

17. The apparatus of claim 15 wherein said electronic control unit monitors a speed of said truck or tractor and wherein said actual ride height is monitored over a shorter period of time when said a motion of said truck or tractor is one of moving at a slow speed and stopped.

18. The apparatus of claim 15 wherein said electronic control unit controls a duration an air spring valve is opened to adjust said ride height based on said rear axle load.

19. The apparatus of claim 18 wherein a duration the air spring valve opens to fill an air spring increases as rear axle load increases.

20. The apparatus of claim 15 wherein said electronic control unit only adjusts actual ride height when said difference between said actual ride height and said optimum ride height exceeds a threshold value.

21. An apparatus for controlling the ride height in a suspension of an over the highway truck or tractor having a rear axle, said method comprising: a) an engine torque sensor; b) an acceleration sensor; c) an electronic control unit coupled to said sensor engine torque sensor and said acceleration sensor, said electronic control unit calculates a rear axle load based on input from said engine torque sensor and said acceleration sensor and calculates an optimum ride height that corresponds to correct driveline angles based on said rear axle load; d) a height sensor coupled to said electronic control unit for measuring an actual ride height of said over the highway truck or tractor, said electronic control unit calculates a difference between said optimum ride height and said actual ride height; and e) a valve coupled to said air spring and controlled by said electronic control unit to adjust an amount of air in said air-spring to adjust said actual ride height to a height closer to said optimum ride height.

22. The apparatus of claim 21 wherein said electronic control unit monitors said actual ride height over a period of time and removes a dynamic component of the actual ride height.

23. The apparatus of claim 21 said electronic control unit monitors a speed of said truck or tractor and wherein said actual ride height is monitored over a shorter period of time when said a motion of said truck or tractor is one of moving at a slow speed and stopped.

24. The apparatus of claim 21 wherein said electronic control unit controls a duration an air spring valve is opened to adjust said ride height based on said rear axle load.

25. The apparatus of claim 24 wherein a duration the air spring valve opens to fill an air spring increases as rear axle load increases.

26. A suspension assembly, comprising: a) a trailing arm; b) a hanger bracket attached to a vehicle frame member and a leading end of said trailing arm, said hanger bracket defining a pivot axis for said trailing arm; c) an air spring disposed between a spring seat attached to said trailing arm and said frame member; d) an axle attached to said trailing arm; e) a pressure sensor coupled to said air spring for measuring a pressure in said air spring to determine a load on said axle; f) an electronic control unit coupled to said pressure sensor that calculates an optimum ride height that corresponds to correct driveline angles based on said axle load; g) a height sensor coupled said frame member and said trailing arm, said height sensor provides a signal to said electronic control unit for determining an actual ride height, said electronic control unit calculates a difference between said optimum ride height and said actual ride height; and h) a valve coupled to said air spring and controlled by said electronic control unit to adjust an amount of air in said air spring to adjust said actual ride height to a height closer to said optimum ride height.

27. The assembly of claim 26 wherein said electronic control unit monitors said actual ride height over a period of time and removes a dynamic component of the actual ride height.

28. The assembly of claim 26 wherein said electronic control unit monitors a speed of said truck or tractor and wherein said actual ride height is monitored over a shorter period of time when said a motion of said truck or tractor is one of moving at a slow speed and stopped.

29. The assembly of claim 26 wherein said electronic control unit controls a duration the air spring valve is opened to adjust said ride height based on said rear axle load.

30. The apparatus of claim 26 wherein a duration the air spring valve opens to fill an air spring increases as rear axle load increases.

31. A suspension assembly, comprising: a) a trailing arm; b) a hanger bracket attached to a vehicle frame member and a leading end of said trailing arm, said hanger bracket defining a pivot axis for said trailing arm; c) an air spring disposed between a spring seat attached to said trailing arm and said frame member; d) an axle attached to said trailing arm; e) an engine torque sensor; f) an acceleration sensor; g) an electronic control unit coupled to said sensor engine torque sensor and said acceleration sensor, said electronic control unit calculates a rear axle load based on input from said engine torque sensor and said acceleration sensor and calculates an optimum ride height that corresponds to correct driveline angles based on said rear axle load; h) a height sensor coupled said frame member and said trailing arm, said height sensor provides a signal to said electronic control unit for determining an actual ride height, said electronic control unit calculates a difference between said optimum ride height and said actual ride height; and i) a valve coupled to said air spring and controlled by said electronic control unit to adjust an amount of air in said air spring to adjust said actual ride height to a height closer to said optimum ride height.

32. The assembly of claim 31 wherein said electronic control unit monitors said actual ride height over a period of time and removes a dynamic component of the actual ride height.

33. The assembly of claim 31 wherein said electronic control unit monitors a speed of said truck or tractor and wherein said actual ride height is monitored over a shorter period of time when said a motion of said truck or tractor is one of moving at a slow speed and stopped.

34. The assembly of claim 31 wherein said electronic control unit controls a duration the air spring valve is opened to adjust said ride height based on said rear axle load.

35. The apparatus of claim 31 wherein a duration the air spring valve opens to fill an air spring increases as rear axle load increases.

* * * * *